United States Patent
Keith

(10) Patent No.: US 8,289,155 B1
(45) Date of Patent: Oct. 16, 2012

(54) TRANSPORTING MATERIAL

(76) Inventor: Charles E. Keith, Edmond, OK (US)

(*) Notice: Subject to any disclaimer, the term of this patent is extended or adjusted under 35 U.S.C. 154(b) by 231 days.

(21) Appl. No.: 12/803,610

(22) Filed: Jun. 30, 2010

(51) Int. Cl.
*G08B 1/08* (2006.01)

(52) U.S. Cl. .......... 340/539.13; 340/603; 340/613; 340/618

(58) Field of Classification Search .... 340/572.1–572.9, 340/10.1–10.6, 686.1, 612–613, 615–618, 340/603, 539.13
See application file for complete search history.

(56) References Cited

U.S. PATENT DOCUMENTS

| | | | | |
|---|---|---|---|---|
| 8,058,987 | B1* | 11/2011 | Battista | 340/539.13 |
| 2008/0094209 | A1* | 4/2008 | Braun | 340/539.13 |
| 2010/0095559 | A1* | 4/2010 | Buckner | 37/304 |

OTHER PUBLICATIONS

Central Processing Unit, Answers.com, Apr. 12, 2010, pp. 2.
Global Positioning System, www.gps.com, Feb. 28, 2010, pp. 2.
LoadMaxx, Air-Weigh Scales, Jun. 8, 2010, pp. 2.
SeeLevel Gauge, Garnet Technologies, Jun. 8, 2010, pp. 1.

* cited by examiner

*Primary Examiner* — George Bugg
*Assistant Examiner* — Sharmin Akhter
(74) *Attorney, Agent, or Firm* — Thomas R. Weaver

(57) ABSTRACT

There is provided a method of electronically gathering, storing and reporting information pertaining to the transport of material, such as water, from one location to another location. The invention permits rapid receipt of such information by interested parties to thereby permit timely action and/or oversight where such information indicated the need for such action.

6 Claims, 2 Drawing Sheets

TRANSPORTING MATERIAL

BACKGROUND OF THE INVENTION

1. Technical Field of the Invention

This invention relates to the transportation of materials from one designated location to another designated location, and, more particularly, to a method of gathering, storing, interpreting, quantifying and reporting data pertaining to the transportation of materials from one designated location to another designated location.

2. Description of the Prior Art and Problems Solved

It is known that bulk materials, can be, and are, transported in containers over roads and highways from one designated location to another designated location, wherein such containers are ordinarily mounted on or hauled by vehicles, such as trucks. As used herein, the term "bulk materials" includes solids, liquids and mixtures of solids and liquids. It is also known that the transport of bulk materials can, and ordinarily does, require the preparation of a trip report which such report includes information which identifies the container, the driver, the loading and delivery locations of the materials, locations of intermediate delays, stops or pauses, the transportation time and the nature and quantity of materials transported between the loading and delivery locations. It is still further known that the trip report is based on information contained in a record book or a trip log manually prepared by, for example, the driver of the truck, during the course of the transportation.

The accuracy of the information recorded by the driver in the trip log can be affected by the interest and/or fatigue of the driver upon preparation of the trip log and by passage of time preceding preparation of the trip report. The prepared trip report is then transmitted to some interested party, such as a governmental agency, a shipper or a carrier. The time interval between delivery of the material to an intended destination, and the transmittal of the trip report to the interested party can be unreasonably extended and, in fact, untimely.

What is required is a method of eliminating manual record keeping and manual preparation and transmittal of a trip report to an interested party.

In one specific aspect, large volumes of water are used in a variety of industrial processes. The acquisition of water, particularly in large volumes, has been a problem in terms of the geographical location of the source of the water and the geographical location of the use of the water. In this regard, the distance over which the water must be transported, the transportation route, the transportation vehicle or means and the time of transportation are directly impacted by the location of the water source and the location of the water use.

In many instances, a process requiring water cannot begin until all required water is present at the location of use. In such cases, on-site storage of transported water can be a complication in terms of storage capacity as well as the efficient performance of the process.

The quality of the water, that is, its portability and/or chemical content, required to be employed in a given process still further complicates the problem of acquisition of useful water and the mentioned associated problems of transportation distance, route, transport means and transportation time.

An additional problem which must be confronted in connection with the use of water in an industrial process is the handling of such water after completion of the process. This problem includes the recovery and potential chemical treatment of used water and the disposal and/or transportation of used water in a manner which will minimally affect ecological interests.

An example of a large volume of water employed in an industrial process is the volume of water employed in the recovery of hydrocarbons from a subsurface formation. One such process is included within a group of services broadly referred to as formation stimulation, and is more specifically referred to by those skilled in the art as hydraulic fracturing.

In the practice of hydraulic fracturing, a large volume of water is introduced into a cased borehole which intersects a subsurface formation containing fluid hydrocarbons, such as oil and gas. The pressure of the water at the intersection of the borehole and the formation is increased to a value sufficient to fracture the formation, that is, to form a crack in the formation. Thereafter, a quantity of water is forced into the formed fracture to widen and extend the crack into the formation. Fluid hydrocarbons flow out of the formation into the formed crack, then to the borehole and then to the surface of the earth where the hydrocarbons are captured for further treatment.

In more specific terms, water initially introduced into the cased borehole is actually a blend of water, sand and a thickening agent, i.e., a material which operates to increase the viscosity of the water. The blend is broadly referred to as a fracturing fluid. The fracturing fluid may also contain other materials, for example, a chemical, sometimes referred to in the art as a cross-linking agent, which reacts with the dispersed thickening agent to further increase the viscosity of the water, a chemical, sometimes referred to in the art as a breaker, which operates to reduce the viscosity of the water and a chemical, referred to in the art as a scale inhibitor, which operates to prevent the formation of scale on down hole equipment and formations.

A volume of liquid, preferably equal to the volume of liquid components initially introduced into the borehole, must be recovered from the borehole to enable the flow of fluid hydrocarbons out of the formation to the surface of the earth. This volume is commonly referred to as flow back. Flow back is a combination of water initially introduced into the bore hole, liquid reaction products of chemicals introduced into the bore hole and water naturally present in the formation (sometimes referred to as formation or connate water). Sand initially introduced into the borehole preferably enters the formed fracture and remains therein to prop the fracture open to enable flow of fluid hydrocarbons in the fracture. Sand is preferably not included in the flow back stream.

There has now developed a need to document, store and report information pertaining to gathering and transporting water employed in hydraulic fracturing and to document, store and report information pertaining to gathering, treating and disposal and/or use of flow back.

SUMMARY OF THE INVENTION

This invention provides a method for the non-manual collection of data relating to the movement of materials, followed by rapid analysis and interpretation of the collected data and reporting of such analysis and interpretation to an interested party. More specifically, the invention is real time method comprising collecting, recording, analyzing and reporting information involved to the movement of material from its point of acquisition to its point of delivery. The method is a combination of elements which cooperate to electronically collect, record, store, analyze and report the volume, or weight of material which is transported from one location to another location. In one aspect, the method analyzes the collected information and prepares a report for delivery to an interested party. The report includes data which identifies the transport mode, the delivery route, the quantities acquired and delivered and delivery time. The method encompasses a single transaction as well as multiple transactions with multiple devices simultaneously from multiple locations.

Information collected in accordance with the method describes by latitude and longitude coordinates the material loading point, sometimes referred to herein as the first specified location, and the intended material un-loading point, sometimes referred to herein as the second specified location. The information collected also includes the date and time when the material was obtained at the first specified location and the date and time when the material was delivered to the second specified location. The information collected still further includes the quantity and chemistry (if required) of the material which was obtained at the first specified location, the identity of the carrier and the method employed to deliver the material which was obtained at the first specified location and the delivery route taken from the first specified location to the second specified location.

The information collected and stored enables the calculation of the distance between the first specified location and the second specified location, the calculation of the time elapsed between obtaining the material and delivering the material and the calculation of the total quantity of material delivered to a specified location during multiple separate deliveries over a period of time.

In addition, the invention provides information (of the type mentioned above) pertaining to material delivered to a location other than the specified second location.

In one specific aspect, the invention provides a method of collecting, storing, interpreting, quantifying and disseminating information pertaining to the movement of a liquid, such as water, obtained at a first specified location and delivered to a second specified location. In the liquid moving aspect, this invention can also include the collection and reporting of information pertaining to liquid transported in a pipeline.

DESCRIPTION OF THE DRAWINGS

FIG. 1 illustrates a single transaction. The single transportation illustrated in FIG. 1 can occur in different locations at the same time. In all transactions, both single and multiple, all information collected is recorded, stored and analyzed in a central location.

DESCRIPTION OF THE INVENTION

Figure 1:
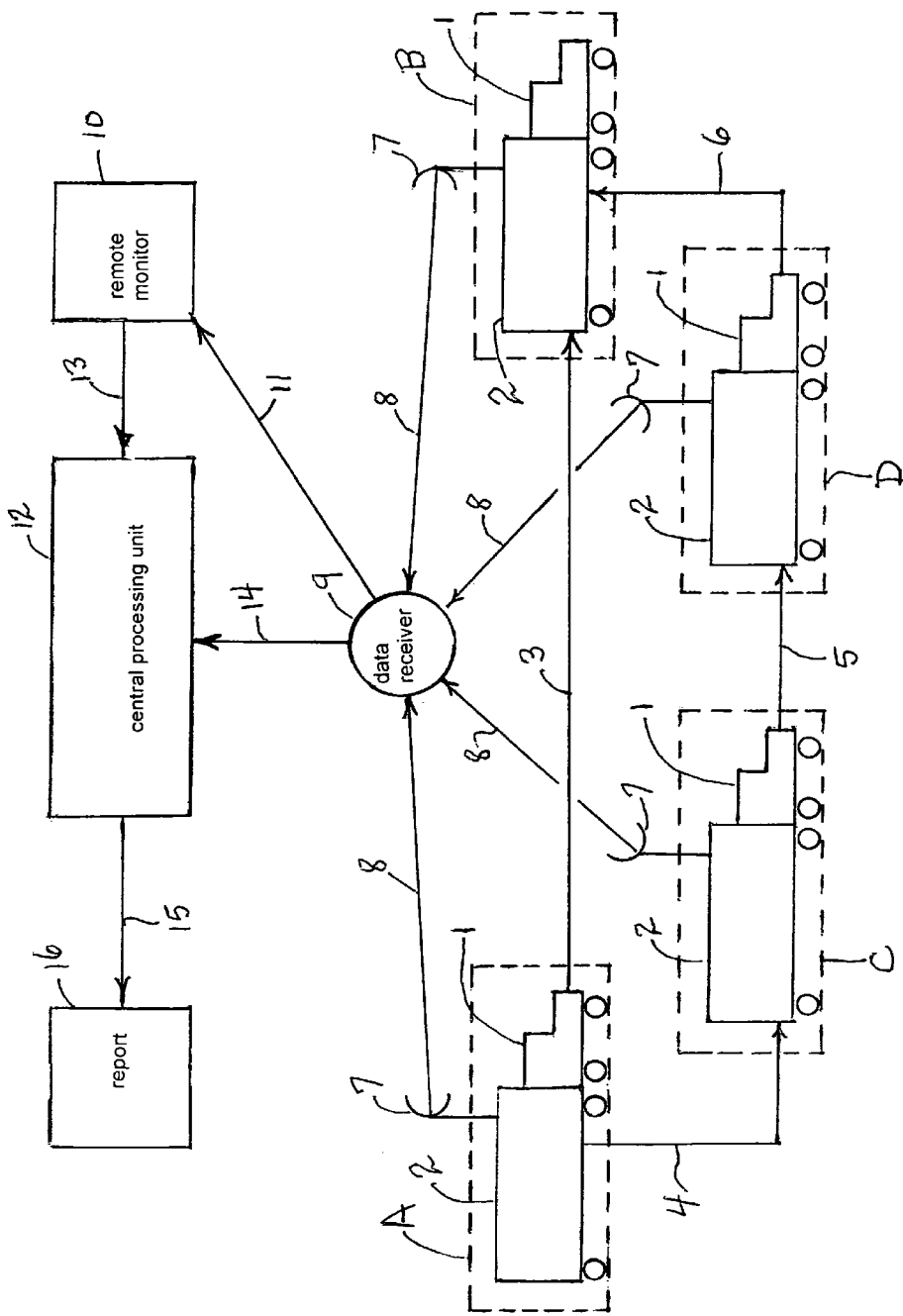
FIG. 1 is a diagram which graphically illustrates the flow of information resulting from the physical transportation of material from one location to another location.

Referring now to FIG. 1, truck 1, which supports and carries container 2, is indicated to be present within locations A, B, C and D which such locations are shown as areas enclosed by dashed lines. (It is to be understood that truck 1 and container 2 cannot simultaneously be present in locations A, B, C and D.)

Truck 1 and container 2 can directly proceed from location A to location B via path 3 or indirectly via different paths, such as paths 4, 5 and 6 through intermediate locations C and D. For purposes of this disclosure, location A is hereinafter sometimes referred to as the first location, or the material loading point, and location B is hereinafter sometimes referred to as the second location, or the intended material un-loading point. There can be any number of sites intermediate locations A and B which may be accessed by truck 1. Some of such intermediate locations can be sites which container 2 may be permitted to enter, these sites are hereinafter sometimes referred to as authorized sites. Conversely, some intermediate locations can be sites which container 2 may not be permitted to enter, these sites are hereinafter sometimes referred to as un-authorized sites. Locations C and D, respectively, are exemplary of authorized and un-authorized sites.

Figure 2:
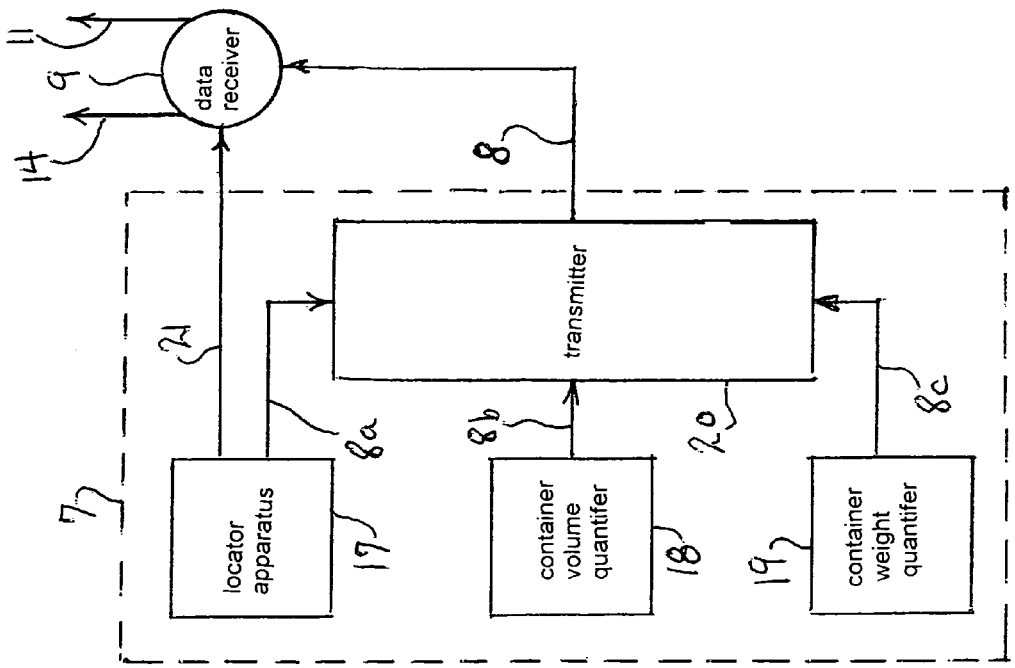
FIG. 2 is a diagram which graphically illustrates the flow of information within a selected portion of FIG. 1. The selected portion is a specific expansion of steps relating to the collection of information which is transferred to a central location.

Container 2 can be equipped with a number of devices which operate to provide information pertaining to the material to be transported. Such devices include a container identifier, load quantifiers a locator apparatus and a transmitter. FIG. 2 shows the load quantifiers, locator apparatus and transmitter enclosed by dashed lines identified by reference numeral 7. The locator apparatus is identified by reference numeral 17; the container volume quantifier is identified by reference numeral 18; the container weight quantifier is identified reference numeral 19; and the transmitter is identified by reference numeral 20. The items of information generated by locator volume quantifier 18 and weight quantifier 19 are transferred to transmitter 20 by wires 8a, 8b and 8c respectively. Each of the mentioned devices is further described below. The information from the described devices is accumulated in transmitter 20 which then transmits the information to communications link terminal 9 by path 8.

Container 2 is equipped with an electronic data marker or tag which contains information which uniquely identifies container 2. The tag was previously referred to as the container identifier. Such identifying data can include a unit number, truck license number, driver name, container volume, container tare weight and any other information pertaining to the loading and physical movement of material. The information included in the container identifier is placed in a data base in central processing unit 12 prior to acquisition of the material at material loading point A. Central processing unit 12 is discussed below.

Load measuring devices can be installed on container 2. One such device 18 is employed to help determine the volume of material in container 2. Another such device 19 automatically measures the weight of material loaded in container 2. The load measuring devices were previously referred to as load quantifiers. A load quantifier is optionally installed on container 2. The presence of a load quantifier on container 2 dispenses with the requirement of including volume and weight data in the previously mentioned container identifier and in central processing unit 12.

Load measuring devices useful herein are commercially available. In this regard a liquid level gauge, such as device 18, is available from Garnet Industries, Inc., of Garland, Tex., under the trademark SeeLevel Gauges. In use, the relationship between liquid level and container geometry is placed in central processing unit 12 to enable machine calculation of liquid volume from liquid level. A weight scale 19 is available from Air-Weigh International of Willow Creek, Oreg., under the trademark LoadMaxx.

Container 2 is equipped with a locator apparatus 17, which at precise intervals of time, interprets electronic signals to determine the terrestrial location of container 2 by latitude, longitude and elevation. The locator apparatus is a Global Positioning System (GPS) receiver, an example is commercially available from Garmin Ltd of Olathe, Kans.

Container 2 is equipped with transmitter 20, an electronic sending device, which can be the combination of a data processor, a modem and antenna 7. Information from transmitter 20 transmits information via electronic path 8 to receiver 9. As mentioned, the data transferred identifies the container, the material load and the container location. Data is transmitted from 180 container 2 to receiver 9 whenever container 2 enters and leaves any of locations A, B, C and 181D. Transmitter 20 is a wireless machine-to-machine device such as that available from Digi International of Minnetonka, Minn.

In one aspect, communication link terminal 9, upon receipt of data from antenna 7, can immediately transmit the data to a remote monitor 10 via electronic path 11 which then immediately transmits the data to central processing unit 12 via electronic path 13. In another aspect, communication link terminal 9, upon receipt of data from antenna 7, can immediately transmit the data to central processing unit 12 via electronic path 14. Communication link terminal 9 can be a satellite, or a cell phone tower or a radio tower.

Information from locator apparatus 17 can be transmitted to transmitter 20 by line 8a or directly to communications link terminal 9 by wireless path 21.

Central processing unit (CPU) 12 is a digital computer which is programmed as is known in the art of data processing to manipulate data transmitted from terminal 9. CPU 12 stores information associated with a particular container identifier. CPU 12 also stores information pertaining to the presence of a container bearing a particular container identifier in an authorized location, such as locations A, B and C illustrated in FIG. 1, and an unauthorized location, such as location D illustrated in FIG. 1. In this regard, information received from the load quantifier, and the locator apparatus is manipulated by CPU 12 to prepare report 16 which is immediately transmitted to an interested authority via electronic path 15.

Report 16 discloses the elapsed time between first location A and second location B, the load data at first location A and second location B. Report 16 also discloses time spent and load changes, if any, at authorized locations C and un-authorized locations D.

Figure 3:
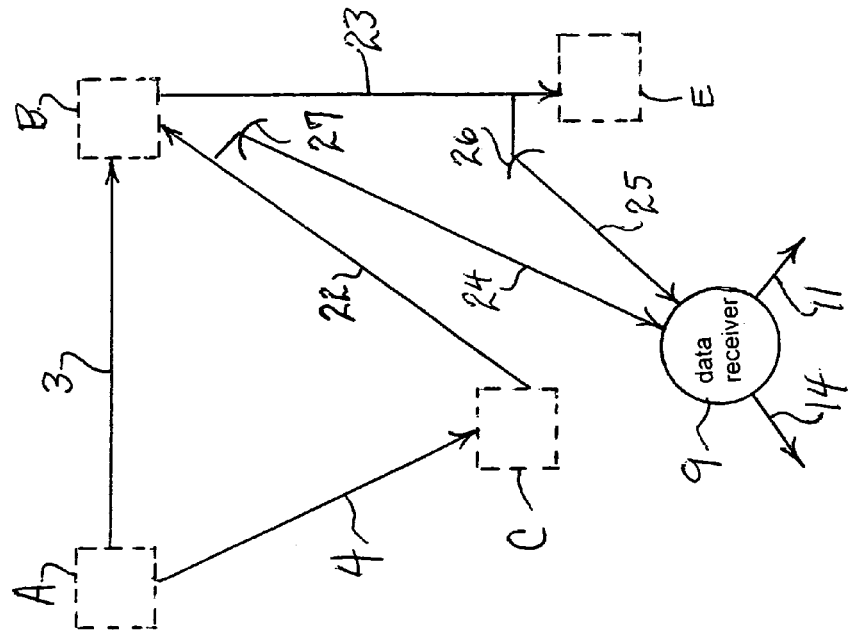
FIG. 3 is a diagram which graphically illustrates the flow of information resulting from the physical transportation of liquid from one location to another location by truck-mounted container and pipeline.

FIG. 3 is a variation of FIG. 1 wherein water placed in container 2 at material loading point A is transported to material un-loading point B via path 3, or first to authorized location C via path 4 and then to point B by pipeline 22. The flow of information to CPU 12 as a result of the transport of water to locations B and C over paths 3 and 4, respectively, is described in connection with the description of FIG. 1. The volume of water transported to location B from location C by pipeline 22 is measured by a flow meter at location B; the metered volume is then transmitted by antenna 27 to communications link terminal 9 via electric path 24. The information thus transmitted is treated as previously described in connection with FIG. 1. Liquid transported from location B, such as flow back from a well, to a disposal location, such as location E, can be moved via pipeline 23. The volume of water transported to location E from location B by pipeline 23 is measured by a flow meter at location E; the metered volume is then transmitted by antenna 26 to communications link terminal 9 via electric path 25. The information thus transmitted is treated as previously described in connection with FIG. 1.

1. Operation of the Invention

The physical addresses and the GPS coordinates of specific locations where identified materials are to be transported from and transported to are collected and entered in a data base maintained in CPU 12. Such specific locations are exemplified in FIGS. 1 and 3 as locations A, B, C and E.

Specific containers to be utilized to transport the identified materials to and from the specific locations are identified and assigned a container identifier which is entered in a data base maintained in CPU 12.

Notice that the materials to be transported must be specifically identified. Accordingly, specific materials, specified locations and specific containers must be coordinated.

In addition, the physical addresses and the GPS coordinates of specific locations where an identified container transporting a specific material is permitted to enter and is not permitted to enter are collected and entered in a data base maintained in CPU 12. Such locations are exemplified in FIG. 1 as locations C and D, respectively.

The letters GPS employed herein refer to the Global Positioning System. It is known that the Global Positioning System (GPS) is a space-based global navigation satellite system that provides location and time information in all weather and at all times and anywhere on or near the Earth where there is an unobstructed line of site to four or more GPS satellites. The Global Positioning System is maintained by the United States government and is freely accessible by anyone with a GPS receiver. A GPS receiver is the user segment of the system; it is referred to herein as the locator apparatus which is associated with container 2 in FIG. 1.

Three segments are involved in the GPS. The three segments are the space segment, the control segment and the user segment. The space and control segments are developed, maintained and operated by the US government, wherein the space segment, the GPS satellites, broadcast signals from space, which the GPS receiver, the locator apparatus of this invention, uses to calculate the position of the locator apparatus by latitude, longitude and altitude coordinates plus the current time of the broadcast. It is plain that the position of container 2, which as mentioned is equipped with a locator apparatus, can be determined each time a signal is broadcasted by a GPS satellite. The user segment, in the commercially available form, enables determination of the position of the locator apparatus.

The locator apparatus calculates its position by precisely timing the signals sent by the GPS satellites. Each satellite continually transmits messages which include, the time of transmission from which the locator computes the distance to each satellite and the position of satellite from which information the locator apparatus computes the position of the apparatus at some given time.

A locator apparatus, in general, comprises an antenna, tuned to the frequencies transmitted by the satellites, a data processor and a clock. A typical locator apparatus can simultaneously monitor in the range of from about 4 to about 20 satellite channels. Examples of locator apparatus are commercially available under the trademarks Trimble, Garmin and Leica.

In one aspect, the liquid volume capacity of container 2 can be pre-determined and that pre-determined liquid volume is entered in a data base maintained in CPU 12. Thereafter, container 2 is loaded with the pre-determined volume at the material loading point, location A, the first location, and transported to and unloaded at the intended material un-loading point, location B, the second location. In another aspect, container 2 is loaded with an unknown volume or weight of material at the material loading point, location A; the quantity (volume or weight) of material is thereafter determined by electronic means; and the determined quantity is electronically transmitted to and entered in a data base maintained in CPU 12. The quantity of material electronically determined was previously referred to in the description of FIG. 1 as a load quantifier Devices known to be useful to electronically determine liquid volume or the weight of a container are commercially available from Garnet Industries under the trademark SeeLevel Gauges and Air-Weigh International under the trademark LoadMaxx, respectively.

The location, route and time data generated by the locator apparatus, together with the container identifier and the quantity data gathered by the load quantifer are automatically transmitted by a combination of a modem and antenna 7 via electronic path 8 to receiver 9.

Devices known to be useful to function as modems and antenna 7 are commercially available from Digi International.

The information entered in the data base maintained in CPU 12 is analyzed by suitable and well known programming techniques. The results of such analyses can be accessed by parties having an operational interest in the transportation information, and rapidly disclosed to such parties. Operational interests would include a variety of data such as: the sum of all material acquired from one or more source locations and delivered to one or more use locations; the transportation means and carrier identity; and the date and time of acquisition and delivery of each acquisition.

This invention thus provides a method of rapidly gathering, storing, using and disseminating information pertaining to material, such as water, obtained from a first specified location and delivered to a second specified location.

The information describes the first specified location and the second specified location by latitude and longitude coordinates. The information also includes: the identity of the carrier and the method employed to deliver the material obtained at the first specified location; the date and time when the material was obtained at the first specified location; the quantity of material which was obtained at the first specified location; the delivery route taken from the first specified location to the second specified location; and the date and time when the water was delivered to the second specified location.

The information gathered and stored enables determination of the distance between the first specified location and the second specified location, determination of the time elapsed between obtaining the material and delivering the material and determination of the total quantity of material delivered to a specified location during multiple separate deliveries over a period of time. In addition, the invention provides information (of the type mentioned above) pertaining to material delivered to a location other than the specified second location.

Having described the invention that which is claimed is:

1. A method of tracking the movement of bulk material from a first location to a second location, said method comprising the steps of:
    providing a container for said bulk material, said container having associated therewith systems selected from global positioning systems and data transmission systems;
    employing said global positioning systems to identify said first location by longitude and latitude;
    placing said bulk material from said first location in said container, and determining the quantity of said bulk material placed in said container;
    preparing a record of said bulk material placed in said container, wherein said record comprises said identification of said first location by longitude and latitude, the date and time of placement of said bulk material in said container and the quantity of said bulk material placed in said container;
    employing said data transmission systems to convey said record by electronic transfer to a central computing location separate from said first location and said second location;
    employing said global positioning systems to identify said second location by longitude and latitude;
    specifying a route from said first location to said second location, employing said global positioning systems to identify said route by longitudinal and latitudinal coordinates;
    transferring said container containing said bulk material to said second location, and determining the quantity of said bulk material transferred;
    preparing a record of said bulk material transferred to said second location, wherein said record includes the path taken from said first location to said second location by longitude and latitude, said identification of said second location by longitude and latitude, the date and time of said transferring of said bulk material from said container to said second location and the quantity of said bulk material transferred from said container; and
    employing said data transmission systems to convey said record by electronic transfer to a central computing location separate from said first location and said second location.

2. The method of claim 1 wherein said bulk material is water from said first location withdrawn directly from surface sources, water withdrawn directly from subsurface sources and water withdrawn directly from municipal plant sources.

3. The method of claim 2 wherein second location comprises water disposal locations and water use locations, said water disposal locations include brine plants, water treatment plants, water injection wells, desalination plants and irrigation and said water use locations include well drilling sites.

4. A method of tracking the movement of water from a first location to a second location, said method comprising the steps of:
    providing a container for said water, said container having associated therewith communication devices selected from global positioning systems, radio frequency identification systems and a water measuring device;
    identifying said first location by longitude and latitude;
    employing said global positioning systems to guide the positioning of said container at said first location;
    placing source water from said first location in said container, and determining the quantity of said source water placed in said container with said water measuring device;
    preparing a record of said source water placed in said container, wherein said record comprises said identification of said first location by longitude and latitude, the date and time of placement of said source water in said container and the quantity of said source water placed in said container;
    conveying said record by electronic transfer to a central location separate from said first location and said second location;
    identifying said second location by longitude and latitude;
    specifying a route from said first location to said second location, said route being established by longitudinal and latitudinal coordinates;
    employing said global positioning systems to guide the movement said container along said established route from said first location to said second location, and to guide the positioning of said container at said second location;

transferring said source water from said container to said second location, and determining the quantity of said source water transferred from said container with said water measuring device employing said water measuring device;

preparing a record of said source water transferred from said container, wherein said record includes the path taken from said first location to said second location by longitude and latitude, said identification of said second location by longitude and latitude, the date and time of said transferring of said water from said container to said second location and the quantity of said source water transferred from said container; and conveying said record by electronic transfer to a central location separate from said first location and said second location.

5. The method of claim 4 wherein said source water from said first location comprises fresh water withdrawn directly from surface sources, fresh water withdrawn directly from subsurface sources, fresh water withdrawn directly from municipal plant sources, water which is not fresh withdrawn municipal plant sources and water which is not fresh withdrawn from mine drainage.

6. The method of claim 5 wherein second location comprises water disposal locations and water use locations, said water disposal locations include brine plants, water treatment plants, water injection wells, desalination plants and irrigation and said water use locations include well drilling sites.

* * * * *